(12) United States Patent
Thomas

(10) Patent No.: US 7,600,266 B2
(45) Date of Patent: Oct. 6, 2009

(54) OPTICAL JUKEBOX WITH COPY PROTECTION CACHING AND METHODS OF CACHING COPY PROTECTED DATA

(75) Inventor: Keith Thomas, Vermillion, SD (US)

(73) Assignee: Gateway, Inc., Poway, CA (US)

(*) Notice: Subject to any disclaimer, the term of this patent is extended or adjusted under 35 U.S.C. 154(b) by 860 days.

(21) Appl. No.: 10/609,950

(22) Filed: Jun. 30, 2003

(65) Prior Publication Data

US 2005/0005151 A1  Jan. 6, 2005

(51) Int. Cl.
*G06F 17/30* (2006.01)
(52) U.S. Cl. ............................................. 726/31; 726/26
(58) Field of Classification Search .................... 726/31
See application file for complete search history.

(56) References Cited

U.S. PATENT DOCUMENTS

| | | | |
|---|---|---|---|
| 5,845,104 A | 12/1998 | Rao | |
| 5,930,765 A * | 7/1999 | Martin | ........................ 705/14 |
| 6,230,074 B1 * | 5/2001 | Shinkai | ...................... 700/214 |
| 6,260,143 B1 | 7/2001 | DeCarmo | |
| 6,502,175 B1 | 12/2002 | Krishnan et al. | |
| 6,601,136 B2 * | 7/2003 | Gunaseelan et al. | ......... 711/112 |
| 6,868,452 B1 * | 3/2005 | Eager et al. | .................. 709/231 |
| 6,970,940 B1 * | 11/2005 | Vogel et al. | ................... 709/236 |
| 7,134,145 B1 * | 11/2006 | Epstein | ......................... 726/27 |
| 2002/0002541 A1 * | 1/2002 | Williams | ...................... 705/51 |
| 2002/0129036 A1 * | 9/2002 | Ho Yuen Lok et al. | ... 707/104.1 |
| 2002/0152874 A1 * | 10/2002 | Vilcauskas et al. | ............ 84/600 |
| 2002/0154887 A1 * | 10/2002 | Lu | ................. 386/35 |
| 2003/0037157 A1 * | 2/2003 | Pestoni et al. | ................ 709/231 |
| 2003/0177247 A1 * | 9/2003 | Dunning et al. | ............. 709/228 |
| 2003/0193619 A1 * | 10/2003 | Farrand | ...................... 348/731 |
| 2004/0088730 A1 * | 5/2004 | Gopalan et al. | ................ 725/93 |
| 2005/0005142 A1 * | 1/2005 | Fontijn | ........................ 713/193 |

* cited by examiner

*Primary Examiner*—Emmanuel L Moise
*Assistant Examiner*—David J Pearson
(74) *Attorney, Agent, or Firm*—Pearne & Gordon LLP

(57) ABSTRACT

A copy protection comprehending cache catalog with a media jukebox tracks not only the titles of the media themselves, but also the number of copies of each media title, and the copy protection status of each media. When a particular media is not limited to a set number of licensed users, then this media alone is permitted to be used to support multiple users with the hard drive cache in the media jukebox. If, however, a particular media title is limited to one licensed use at a time, per copy of that title, then the hard drive cache is capable of sending data to match the number of copies of media in the jukebox.

35 Claims, 1 Drawing Sheet

100

| Title of Media | # of copies (M≥1) | Copy protected? | Other(s) |
|---|---|---|---|
| A | 1 | Y | ... |
| B | 5 | Y | ... |
| C | 3 | Y | ... |
| D | 1 | N | ... |
| E | 1 | Y | ... |

OPTICAL JUKEBOX WITH COPY PROTECTION CACHING AND METHODS OF CACHING COPY PROTECTED DATA

BACKGROUND OF THE INVENTION

1. Field of the Invention

The present invention relates to devices, systems, and processes useful for controlling access to data and computer executable instructions contained on computer readable media, and more specifically to controlling such access in accordance with restrictions on the number of copies of such data and instructions that are permitted to be used.

2. Brief Description of the Related Art

Optical jukeboxes have been proposed in the past, as well as systems and methods for using a magnetic media drive (e.g., hard disk drive) to cache some or all of the contents of optical media housed in the jukebox. For example, U.S. Pat. Nos. 5,845,104, 6,260,143, and 6,502,175 describe exemplary systems and methods. While prior systems and methods may have been suitable for some uses, they suffer from some drawbacks and/or are not well suited for some applications.

One of the issues that can result from the use of optical jukeboxes with personal computers (PCs) is that many copyright holders are concerned about protecting their intellectual property, and specifically the copyrights to the contents of a CD or DVD. For example, if there is one copy of a game on a CD in the jukebox, but two people want to play that game at the same time, the hard drive cache used by the jukebox could easily have enough bandwidth to cache the CD, and two (or more) different machines enough data, for the games to operate properly on each of the PCs of the two users. This kind of multiple, simultaneous use of the single copy of the game may, however, run afoul of the copyrights of the copyright holder.

It has previously been proposed to use an optional subscription number limit to limit media use with a DVD/CD jukebox having a hard drive cache; one such system has been commercially available from TenXpert (Austin, Tex.). The TenXpert system, however, requires that media having the same user-license limit be grouped together in the same share volume, and then merely permits a limit to be set on the number of users permitted to simultaneously access that share volume. Thus, the TenXpert system merely counts the number of users accessing a specific portion of the media, and permits a user or administrator to impost a limit on the number of simultaneous users of that portion. Thus, this system relies heavily on these limits being properly set by a person.

PowerFile (Los Gatos, Calif.) has proposed a DVD Jukebox that caches the directories of the jukebox's media on a PC, but the number of accessible discs is limited to the number of optical drives in the jukebox. CD Anywhere (V Communications, Inc, San Jose, Calif.) is commercially available computer software that permits a user to copy the contents of one or more CD's onto a hard disk drive, but copy protection and licensing issues are left to the discretion of the user. These and other prior systems and methods do not address the problems associated with consumer copy protection and licensed use. Accordingly, a need remains for systems and methods that specifically accommodate the use of multiple copies of a single title in a jukebox, while providing a mechanism for restricting access to and/or use of the contents based on the number of copies of or licenses to any single title.

SUMMARY OF THE INVENTION

According to a first aspect of the invention, a multimedia jukebox system comprises a plurality of media, at least one media reading drive, a means for selecting one of said plurality of media and placing said one of plurality of media into one of said at least one media reading drive, means for caching contents of said one of said plurality of media, means for cataloging said plurality of media such that the number of copies M of the same media title are counted, and means for transferring said cache content to a plurality of receiving devices, wherein the means for cataloging limits the number X of said receiving devices that are permitted access to any one title of said plurality of media, so that M is greater than or equal to X.

According to another aspect of the present invention, a multimedia jukebox system comprises a plurality of media, at least one media reading drive, and a mechanism configured and arranged to select one of said plurality of media and placing said one of plurality of media into one of said at least one media reading drive, a cache in communication with said at least one media reading drive capable of storing content of at least one of said plurality of media, a catalog configured to store the number of copies M of the same media of said plurality of media, a communication link for transferring said cache content to a plurality of receiving devices, and wherein the catalog limits the number X of said receiving devices that are permitted access to any one title of said plurality of media, so that M is greater than or equal to X.

According to yet another aspect of the present invention, a method of caching data comprises counting and storing the number M of copies of data, determining and storing the copy protection status of said data, and if the data is copy protected, caching at most M copies of said data.

Still other objects, features, and attendant advantages of the present invention will become apparent to those skilled in the art from a reading of the following detailed description of embodiments constructed in accordance therewith, taken in conjunction with the accompanying drawings.

BRIEF DESCRIPTION OF THE DRAWINGS

The invention of the present application will now be described in more detail with reference to preferred embodiments of the apparatus and method, given only by way of example, and with reference to the accompanying drawings, in which.

DESCRIPTION OF THE PREFERRED EMBODIMENTS

Figures 1, 2:
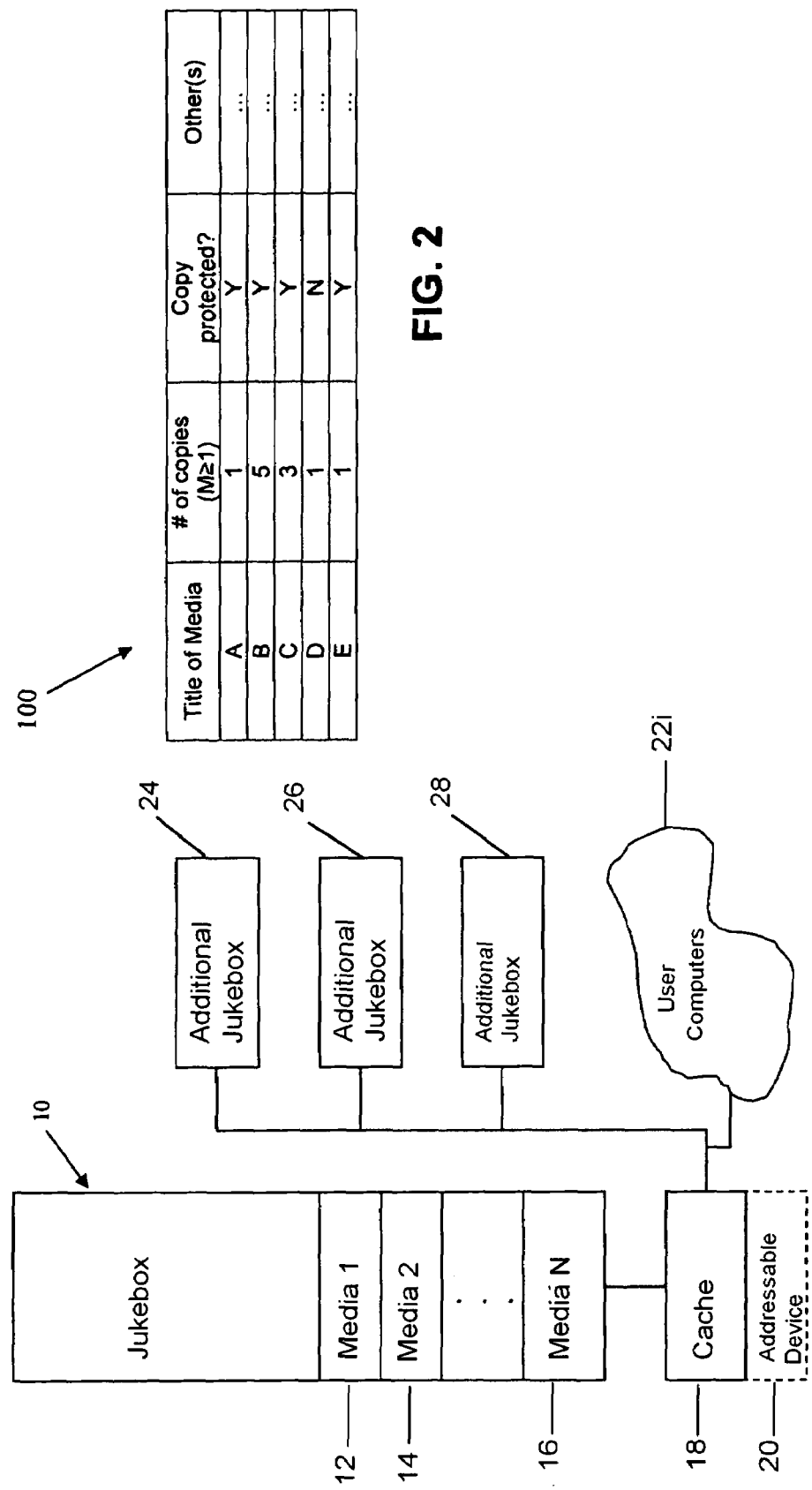
FIG. 1 schematically illustrates an exemplary system in accordance with the present invention.
FIG. 2 diagrammatically illustrates an aspect of the present invention.

Referring to the drawing figures, like reference numerals designate identical or corresponding elements throughout the several figures.

In general terms, the present invention addresses some of the drawbacks in the prior art by utilizing a copy protection comprehending cache with a media jukebox. The titles of the media themselves are not only tracked, but also the number of copies of each media title, and the copy protection status of each media. According to an exemplary embodiment of the invention, when a particular media is not limited to a set number of licensed users, then this media alone could be used to support multiple users with the hard drive cache in the media jukebox. If, however, a particular media title is limited to one licensed use at a time, per copy of that title, then the hard drive cache is capable of sending data to match the number of copies of media in the jukebox. According to another embodiment of the present invention, the cache can also determine the number of titles in other jukeboxes or systems that are logically connected to the cache. In yet another embodiment of the present invention, the data in the cache is encrypted in order to satisfy copyright holders, e.g., utilizing any of numerous known encryption protocols, including, but not limited to, the DTCP (Digital Transmission Content Protection standard; see dtcp.com) encryption that is used on IEEE-1394 (FireWire™) data transfer.

While reference herein is often made to optical media in a jukebox that may be copy protected, the present invention is not limited to optical media, and includes media that is not purely optical, such as semiconductor, magneto-optic, and holographic media. Similarly, the cache described herein is not restricted to cache on a magnetic media drive, but can also alternatively be any other type of media, including semiconductor, magneto-optic, and holographic media.

Turning now to the drawing figures, FIG. 1 illustrates an exemplary embodiment of a system and method useful for managing media use in a jukebox. Those of skill in the art are well acquainted with the construction and use of computer media jukeboxes, and therefore some details will not be discussed so that aspects of the present invention are not obscured.

A jukebox 10 includes N media 12, 14, 16, e.g., CDs, DVDs, semiconductor-based memory elements, or the like, and one or more drives and associated robotics for moving a single media to a drive capable of reading data from that media. As will be readily appreciated by those of skill in the art, the present invention is not limited to jukeboxes having a single media drive, or a single type of media drive, and includes jukeboxes with multiple drives for a single type, or multiple types, of media. That is, the jukebox 10 can include one or more drives, and multiple types of drives can be within the same jukebox, accommodating multiple types of media. The jukebox 10 includes or is in communication with a cache 18, e.g., a hard disk drive cache. The cache 18 can be physically integrated into the jukebox 10, or can be physically separate from, but in communication with, the jukebox, and can be part of a PC or other addressable device 20.

The cache 18 is in signal communication with one or more user computers $22_i$, wherein i≧1, that is, at least one user computer 22 is in communication with the cache. The connection between the cache 18 and the user computer 22 can be any of numerous types of connections, wired and wireless, including direct serial bus, SCSI, LAN, WAN, 802.11a/b/g, Ultra WideBand, etc., and the present invention is not limited to the type of connection between the cache and the user computer. Further optionally, one or more additional jukeboxes and/or systems 24, 26, 28, can be in signal communication with the cache 18, either directly or remotely through any one of the numerous communication links described above. In this manner, the cache 18 can receive data from jukebox 10, and further optionally from any one or more of machines 24, 26, 28.

FIG. 2 illustrates an exemplary catalog 100 maintained for the cache 18 in accordance with the present invention. As discussed above, the catalog 100 maintains records including, but not restricted to, the copy protection status of each media title within the jukebox 18, and further optionally of those within the machines 24-28. The titles of the individual media themselves are not only tracked, but also the number of copies of each media title, and the copy protection status of each media. Other data can be maintained in each record, as will be readily appreciated by those of skill in the art.

With continued reference to FIG. 2, examples of the catalog 100 and its use are illustrated. Exemplary media titles A-E are each assigned a record, including at least the number of copies M of each title A-E that are available to the cache 18, and the copy protection status (Yes, No) of each title. For exemplary media titles A and E, there is one copy each, and they are both copy protected; therefore, the cache catalog logic indicates that only one copy of each title can be cached, restricting access to titles A and E to one user computer $22_i$ each. For exemplary media titles B and C, there are five and three copies, respectively, and they are both copy protected; therefore, five and three copies of the titles B and C, respectively, can be cached. For exemplary media title D, while there is only one copy, it is not copy protected, and therefore the cache catalog logic indicates that multiple copies of the title can be stored in and accessed from the cache 18 as requested by user computers $22_i$. Other permutations of the number of copies and copy protection status of each media title are also within the scope of the present invention.

In the above example, up to the total number of permissible copies of the title are cached. Another aspect of the present invention includes that less than the permissible number is cached. For example, if four users want to use the same title, the logic caches three, two, or preferably only one, copy of the title, and then limits the number of streams of data from the copy or copies to be less than or equal to the total number of permissible copies. Thus, in the description herein of how use of copies of the title is controlled, the present invention also includes control over the number of streams of data from a single title.

Yet another optional aspect of the present invention includes that only the portion or portions of an entire title that is (are) being accessed at a particular time by various users, are cached. For example, three users may be accessing three separate, e.g., 50 MB portions of the same title; thus, the logic caches only these portions, while still limiting the total number of permissible users of the title.

In use, when a request is presented to the logic of cache 18 for one of the N media titles 12-16 of jukebox 10 (or for any other media title addressable by the cache 18) from a user computer $22_i$, the catalog 100 is inspected for the copy protection status of that title. If the requested title is not copy protected, any number of user machines $22_i$ are permitted access to that title, and the title can be stored in the cache 18 and accessed by the user machine. If the requested media title is copy protected, then the catalog 100 is checked for the number of copies M of that title available to the cache 18, and compared to the number of copies X of that title currently in use by user computers $22_i$. If there is an available copy of the title, i.e., if M>X, then the content(s) of the title can be stored in the cache 18 and accessed by the user machine. If M=X, then the content(s) of all of the copies of the media title are being accessed, and further access is denied. In this manner, the catalog inhibits, and preferably prevents, the condition M<X, which would indicate an unauthorized use or copying of the media title. The value X for each media title can be, in accordance with the present invention, dynamically determined, stored, and updated in the catalog 100, or alternatively in another logical location as will be readily apparent to those of skill in the art.

The catalog 100 can be implemented in logical instructions, database management systems, digital circuitry, analog circuitry, and/or similar implementations as will be readily appreciated by those of skill in the art, and is not restricted to any particular implementation or location.

Another optional aspect of the present invention includes that the content media itself, instead of or in addition to the cache 18, can be used to store part or all of the catalog, for which the content media should be a rewritable media type.

Yet another optional aspect of the present invention includes that the cache can be eliminated and the content media itself can be used alone. Those of ordinary skill in the art will appreciate that caching typically improves data transfer rates from the data source, but for particularly fast, random access media, the cache may not significantly improve, or improve at all, the data transfer rate, and therefore may be eliminated.

While the invention has been described in detail with reference to preferred embodiments thereof, it will be apparent to one skilled in the art that various changes can be made, and equivalents employed, without departing from the scope of the invention. Each of the aforementioned documents is incorporated by reference herein in its entirety.

What is claimed is:

1. A multimedia jukebox system comprising:
a plurality of media having media titles;
at least one media reading drive;
means for caching and storing contents of the plurality of media;
means for selecting one of said plurality of media and placing said one of plurality of media into one of said at least one media reading drive;
means for cataloging said plurality of media such that the number of copies M of the same media title is counted, said means for cataloging said plurality of media including means for determining if the media and media title are copy protected and means for determining if the media and media title are not copy protected; and
means for transferring content of said plurality of media to a plurality of receiving devices including user machines comprising computers;
said means for cataloging limits the number X of said receiving devices that are permitted access to any portion of any one title of said plurality of media, so that M is greater than or equal to X if the media and media title are copy protected;
said means for cataloging comprises, for each media title, means for recording the copy protection status of each media title of said plurality of media;
at least one of said plurality of media is rewritable;
said media of the plurality of media is removable and replaceable in the at least one media reading drive to permit reading of content on the media in the media reading drive; and
said means for cataloging said plurality of media permits unlimited number of user machines access to that media title if the requested media title is not copy protected so that multiple copies of the media title can be stored in the means for caching and storing contents of the plurality of media and accessed by the user machines.

2. A multimedia jukebox system in accordance with claim 1, wherein the means for transferring data comprises means for transferring contents of the plurality of media in the means for caching and storing contents of the plurality of media.

3. A multimedia jukebox system in accordance with claim 1, wherein a first portion of said plurality of media is physically located with said means for caching contents, and a second portion of said plurality of media is physically separated from said means for caching, and further comprising means for transferring content from said second portion to said means for caching.

4. A multimedia jukebox system in accordance with claim 1, wherein said means for caching is physically co-located with said at least one media reading drive.

5. A multimedia jukebox system in accordance with claim 1, wherein said means for caching is physically located separately from said at least one media reading drive; and further comprising: means for transferring content from said at least one media reading drive to said means for caching.

6. A multimedia jukebox system in accordance with claim 1, further comprising: means for steaming at least one stream of contents from at least one of said plurality of media.

7. A multimedia jukebox system in accordance with claim 6, wherein the means for streaming comprises means for streaming from the means for caching.

8. A multimedia jukebox system in accordance with claim 1, further comprising: means for encrypting data in the means for caching.

9. A multimedia jukebox system in accordance with claim 1, wherein the means for caching comprises means for caching at least two different portions of said contents for use by at least two different receiving devices.

10. A multimedia jukebox system in accordance with claim 1, further comprising: means for streaming at least one stream of contents from at least one of said plurality of media.

11. A multimedia jukebox system in accordance with claim 10, wherein the means for streaming comprises means for streaming directly from at least one of the plurality of media.

12. A multimedia jukebox system in accordance with claim 10, further comprising: means for encrypting data in the means for streaming.

13. A multimedia jukebox system in accordance with claim 10, wherein the means for streaming comprises means for streaming at least two different portions of said contents for use by at least two different receiving devices.

14. A multimedia jukebox system in accordance with claim 1, wherein the means for recording copy protection status for each media title is configured to record that a media title is a copy protected or that a media title is not copy protected.

15. A multimedia jukebox system in accordance with claim 1, wherein at least a portion of the plurality of media is located separate from the at least one media reading drive, and
wherein the means for selecting and placing moves media from the separate location to the at least one media reading drive to read content on the media.

16. A multimedia jukebox system in accordance with claim 1, wherein the means for selecting and placing physically moves the media of the plurality of media into and out of the at least one media reading drive.

17. A multimedia jukebox system comprising:
a plurality of media, said media being computer-readable storage media for storing content, each of said media comprising a media title;
at least one media reading drive;
a mechanism configured and arranged to select one of said plurality of media and place said one of said plurality of media into one of said at least one media reading drive;
a cache in communication with said at least one media reading drive for storing portions of the content of at least one of said plurality of media;
a catalog configured to store a number of copies M of each of the same media that are available in said plurality of media; and a communication link for transferring the content of the at least one of said plurality of media from said cache to a plurality of receiving devices including user machines comprising computers;

said catalog limits the number X of said receiving devices that are permitted simultaneous access to any one portion of the content of said plurality of media if the media is copy protected, so that X is less than or equal to M for each portion of content;

said cache is configured to cache at least two different portions of the content of at least one of the plurality of media for simultaneous access by at least two different receiving devices;

said media of the plurality of media is removable and replaceable in the at least one media reading drive to permit reading of content on the media in the media reading drive; and said catalog is further configured to
- support multiple users with the cache when the media is not copy protected for a set number of users;
- permit multiple copies of the media title to be stored in and accessed from the cache as requested by user machines when the media title is not copy protected; and
- allow an unlimited number of user machines to access a requested media title from the cache if the requested media title is not copy protected.

18. A multimedia jukebox system in accordance with claim 17, wherein said catalog comprises, for each media title, a data element representative of the copy protection status of each media title of said plurality of media.

19. A multimedia jukebox system in accordance with claim 17, wherein said cache is physically co-located with said at least one media reading drive.

20. A multimedia jukebox system in accordance with claim 17, wherein said cache is physically located separately from said at least one media reading drive, and further comprising: a communication link for transferring content from said at least one media reading drive to said cache.

21. A multimedia jukebox system in accordance with claim 17, further comprising: logic configured to stream at least one stream of contents from at least one of said plurality of media.

22. A multimedia jukebox system in accordance with claim 21, wherein the logic configured to stream comprises logic configured to stream from the cache.

23. A multimedia jukebox system in accordance with claim 17, further comprising: logic configured to encrypt data in the cache.

24. A multimedia jukebox system in accordance with claim 17, further comprising: logic configured to stream at least one stream of contents from at least one of said plurality of media.

25. A multimedia jukebox system in accordance with claim 24, wherein the logic configured to stream comprises logic configured to stream directly from at least one of the plurality of media.

26. A method of caching data, comprising:
identifying different data by title;
providing user machines comprising user computers;
counting a number M of available copies of said data and titles;
storing the number M of available copies of said data and titles in a cache;
determining and storing a copy protection status of said data and titles, wherein the copy protection status of said data and titles includes an indication that said data and titles are copy protected and therefore a number of copies to be made of said data and titles are restricted to the number of M of available copies or an indication that said data and titles are not copy protected and therefore a number of copies to be made of said data and titles are not restricted to the number M of available copies;
if the copy protection status of said data and titles are copy protected, caching at most M copies of at least a portion of said data and titles irrespective of a number of copies requested by a user;
if the copy protection status of said data and titles of said data and titles are not copy protected, caching as many copies of the data and titles as is requested by the user computer; and
if the requested title is not copy protected any number of user machines are permitted access to that title and multiple copies of the title can be stored in and accessed from the cache as requested by user computers.

27. A method in accordance with claim 26, further comprising:
forming a catalog; and wherein storing the number M and storing the copy protection status comprise storing in said catalog.

28. A method in accordance with claim 26, further comprising:
denying access to a copy of at least a portion of said data in said cache when a request for said data has been made, X copies of any portion of said data are in said cache, and M is less than or equal to X.

29. A method in accordance with claim 26, wherein said data is contained on a data storage device selected from the group consisting of a CD, a DVD, a semiconductor memory device, a holographic memory device, and a magneto-optical device.

30. A method in accordance with claim 29, wherein said data storage device is contained in a jukebox, the jukebox comprising: a plurality of data storage media; at least one media reading drive; a mechanism configured and arranged to select one of said plurality of media and place said one of said plurality of media into one of said at least one media reading drive.

31. A method of streaming data, comprising:
providing user machines comprising user computers;
counting and storing a number M of copies of said data;
determining and storing a copy protection status of said data in a cache, wherein the copy protection status of said data includes an indication that said data is copy protected or an indication that said data is not copy protected;
if the data is copy protected, streaming at most M available copies of at least a portion of said data;
if the data is not copy protected, streaming as many copies of the data as requested; and
if the requested data is not copy protected any number of user computers are permitted access to that data and multiple copies of the data can be stored in and accessed from the cache by user computers.

32. A method in accordance with claim 31, further comprising:
forming a catalog; and wherein storing the number M and storing the copy protection status comprise storing in said catalog.

33. A method in accordance with claim 31, further comprising:
denying access to a stream of said data when a request for said data has been made, X copies of at least a portion of said data are being streamed, and M is less than or equal to X.

34. A method in accordance with claim 31, wherein said data is contained on a data storage device selected from the group consisting of a CD, a DVD, a semiconductor memory device, a holographic memory device, and a magneto-optical device.

35. A method in accordance with claim 34, wherein said data storage device is contained in a jukebox, the jukebox comprising: a plurality of data storage media; at least one media reading drive; a mechanism configured and arranged to select one of said plurality of media and place said one of said plurality of media into one of said at least one media reading drive.

* * * * *